April 7, 1931. V. BENDIX 1,799,495
BRAKING SYSTEM
Filed Sept. 11, 1924
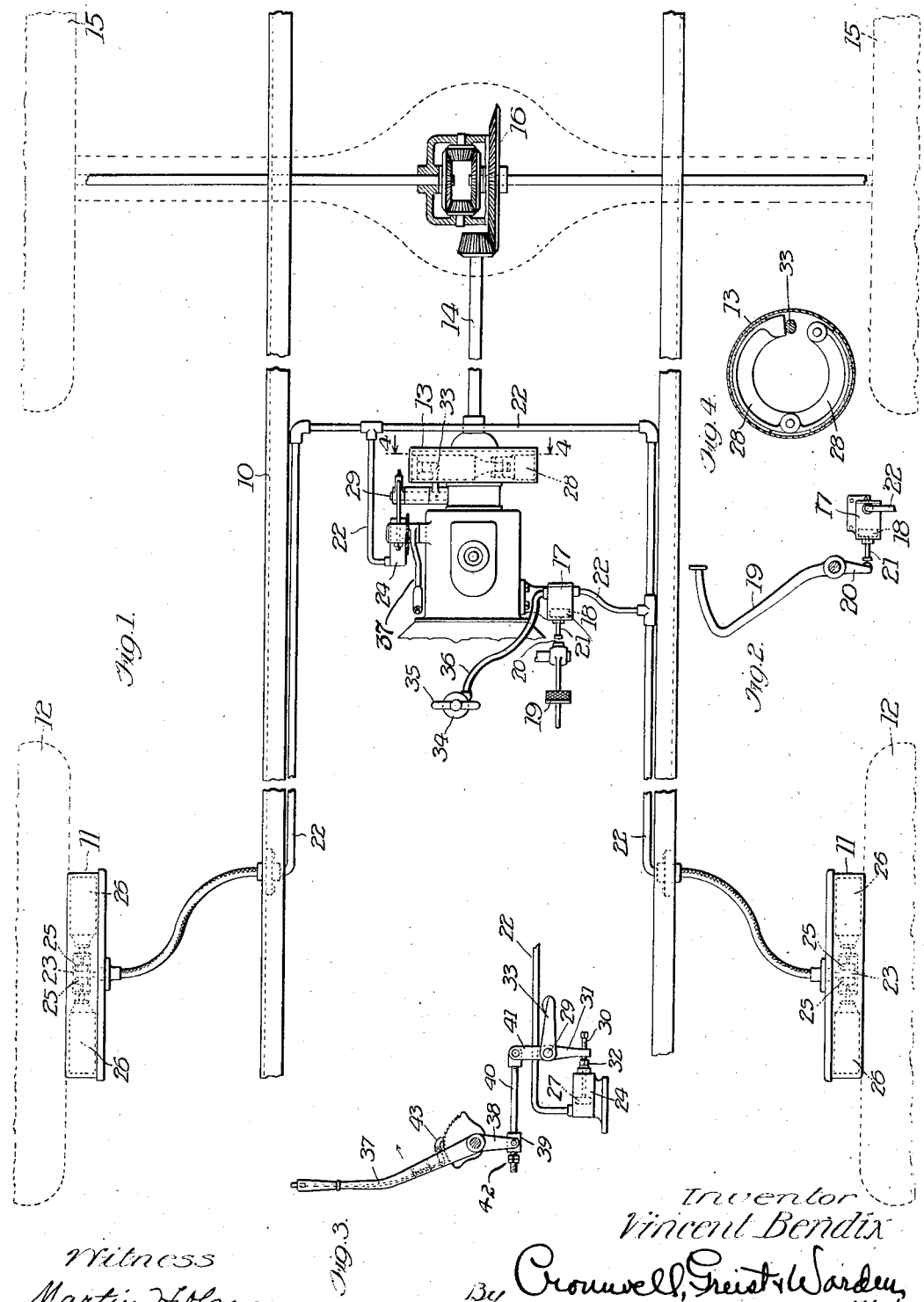

Patented Apr. 7, 1931

1,799,495

UNITED STATES PATENT OFFICE

VINCENT BENDIX, OF CHICAGO, ILLINOIS

BRAKING SYSTEM

Application filed September 11, 1924. Serial No. 737,036.

This invention is concerned with braking systems for motor vehicles, and has for its object the provision of an improved system with which a vehicle may be braked hydraulically or mechanically through an equalized application of the braking stresses to each of the wheels involved in the action.

The system consists essentially in the employment of three brakes, which are applied respectively to the two front wheels and to the power transmission line. The two front wheel brakes and the transmission brake are operated hydraulically with the service pedal, while the transmission brake may also be operated mechanically with the emergency or parking lever. When all three brakes are operated with the service pedal, the braking stresses are applied equally to all four wheels, being equalized between the two front wheels hydraulically through the fluid in the system, between the two rear wheels mechanically through the rear axle differential, and between the two front and two rear wheels hydraulically through the fluid in the system; and, when the transmission brake is operated with the emergency lever, the braking stresses are applied equally to the two rear wheels.

In order that the invention may be readily understood an exemplifying embodiment of the same is set forth in the accompanying drawing and in the following detailed description based thereon. The invention is obviously susceptible of embodiment in other structurally different forms coming equally within the comprehensive scope of the appended claims.

In the drawing—

Fig. 1 is a plan view of a vehicle chassis equipped with the braking system;

Fig. 2 is a side view of that portion of the control mechanism associated with the service pedal;

Fig. 3 is a side view of that portion of the control mechanism associated with the emergency lever; and Fig. 4 is a vertical section on the line 4—4 of Fig. 1.

It will be observed in the drawing that the braking system is mounted upon the chassis 10 of a vehicle, and includes two front wheel brakes 11 operatively associated with the two front wheels 12 to brake the same, and a transmission brake 13 operatively associated with the transmission line 14 to brake the two rear wheels 15 through the rear axle differential 16.

The three brakes mentioned are operated hydraulically with a suitable fluid under pressure from a main fluid cylinder 17 which is provided with a piston 18. The pivotally mounted service pedal 19 of the vehicle has an arm 20 which contacts with a rod 21 on the end of the piston 18 and moves the piston longitudinally of the cylinder when the pedal 19 is depressed. The pressure brought to bear upon the fluid in the cylinder by the movement of the piston is transmitted to fluid which occupies a conduit 22 communicating with the cylinder, and the fluid in the conduit 22 in turn transmits such pressure through suitable branches of the conduit to fluid which occupies fluid cylinders 23 and 24 adjacent the three brakes. Each of the cylinders 23 contains two pistons 25 which are connected with and move the oppositely acting brake shoes 26 of the associated brake 11. The cylinder 24 contains a piston 27 which is connected with the movable one of two self-wrapping brake shoes 28 of the associated brake 13 through an operating member in the form of a rockshaft 29. A rod 30 on the piston 27 extends loosely through an aperture in an arm 31 secured to the rockshaft and is provided with an adjustable stop 32 which contacts with and moves the arm 31, and an arm 33 secured to the rockshaft in turn contacts with and moves one of the brake shoes 28. It will be understood from this construction that when the service pedal is depressed, the piston 18 will be moved longitudinally of the cylinder 17, and the pistons 25 and 27 will be moved longitudinally of the cylinders 23 and 24 to apply the three brakes. The braking stresses thus transmitted to the four wheels will be equalized since the braking stresses applied to the two front wheels will be equalized hydraulically through the fluid in the system, those applied to the two rear wheels will be equalized mechanically through the rear axle differential, and those applied to the front and rear wheels will be equalized hydraulically through the fluid in the system. In initially determining the size of the cylinder 24 relative to the cylinders 23 for the purpose of effecting such equalization between the braking stresses applied to the front and rear wheels, the reduction through the differential is of course taken into consideration.

The fluid occupying the conduit 22 and the cylinders 17, 23 and 24 may be replenished from a reservoir 34 by means of a pump 35 which may be used to force additional fluid from the reservoir into a conduit 36 communicating with the cylinder 17.

The transmission brake 13, though operated hydraulically in conjunction with the two front wheel brakes 11, may be operated independently with emergency lever 37. This arrangement permits a positive mechanical braking of the vehicle in the event of a failure of the hydraulic coupling to function properly, and provides means for braking the vehicle when the same is parked. The lever 37 is provided with a downwardly-extending arm 38 which pivotally carries a block 39. The block 39 is apertured to receive a pull rod 40 which connects with an arm 41 secured to the previosuly mentioned shaft 29. When the transmission brake 13 is operated hydraulically and the shaft 29 is rocked the rod 40 will slide freely through the block, but, when the transmission brake is operated mechanically, the block 39 will engage with an adjustable stop 42 on the rod 40 and will rock the shaft 29 to apply the brake. A suitable ratchet and pawl arrangement 43 is located on the emergency lever for the purpose of releasably holding the same with the transmission brake set.

As used in the present disclosure and claims the term "hydraulic" has reference to any liquid or gas capable of transmitting pressure, and the term "transmission brake" has reference to a brake located at any point along the power transmission line. The particular transmission brake illustrated is covered by application No. 37,660, filed June 17, 1925, by Adiel Y. Dodge.

I claim:

1. A braking system for motor vehicles, comprising two front wheel brakes, a propeller shaft and reduction gearing including a differential connecting it to the rear wheels, a brake on the propeller shaft, a hydraulic coupling for operating all three brakes, and a mechanical coupling for operating the transmission brake only.

2. A braking system for motor vehicles, comprising two front wheel brakes, a propeller shaft and reduction gearing including a differential connecting it to the rear wheels, a brake on the propeller shaft, a hydraulic coupling for operating all three brakes, a mechanical coupling for operating the transmission brake only, and levers for actuating the respective couplings independently of each other.

3. A braking system for motor vehicles, comprising two front wheel brakes, a transmission brake, hydraulic means for operating the front wheel brakes, a service pedal for actuating the hydraulic means, a mechanical device for operating the transmission brake only and arranged to be operated by said hydraulic means, and an emergency lever having an overrunning connection with the mechanical device.

4. A braking system for motor vehicles, comprising a transmission brake, an oscillatory member for applying the same, a fluid actuated rod, a connection between the rod and the member for oscillating the latter upon movement of the rod, a mechanically actuated rod, means for operating the mechanically actuated rod at one end, a connection at the other end of the rod between the rod and the member for oscillating the latter upon movement of the rod in one direction, the connection at one end of the mechanically actuated rod being an overrunning connection, whereby when the member is oscillated by movement of the fluid actuated rod, such oscillation will not cause movement of the mechanically actuated rod.

5. A braking system for motor vehicles, comprising a transmission brake, an oscillatory member for applying the same, a fluid actuated rod, an overrunning connection between the rod and the member for oscillating the latter upon movement of the rod in one direction, a mechanically actuated member, and an overrunning connection between said member and the oscillatory member for oscillating the latter upon movement of the rod in one direction, whereby when the member is oscillated by movement of one of the two elements provided for that purpose such oscillation will not cause movement of the other of the elements.

6. A braking system for motor vehicles, comprising a transmission brake, an oscillatory member for applying the same, a fluid actuated piston, an overrunning thrust connection between the piston and the member for oscillating the latter upon movement of the piston toward the same, a lever, and an overrunning draw connection between the lever and the member for oscillating the latter upon movement of the lever toward the same, whereby when the member is oscillated by movement of one of the two elements provided for that purpose such oscillation will not cause movement of the other of the elements.

7. A braking system for motor vehicles, comprising two front wheel brakes, a transmission brake, a fluid cylinder, a piston in the cylinder, a service pedal connected with the piston, three fluid cylinders adjacent the three brakes in communication with the first mentioned cylinder, pistons in the cylinders, connections between the pistons and the three brakes for hydraulically applying the latter when the service pedal is depressed, and an emergency lever operable upon the connection to the transmission brake for mechanically applying the latter independently of the other brakes.

8. In a vehicle having front wheel brakes and a transmission brake, the combination of: an operating lever and equalizing means connecting said lever with said wheel brakes and said transmission brake so that all of said brakes are uniformly applied by said lever.

In testimony whereof, I have hereunto signed my name.

VINCENT BENDIX.